US011905076B2

(12) United States Patent
Chen

(10) Patent No.: US 11,905,076 B2
(45) Date of Patent: Feb. 20, 2024

(54) CONTAINER

(71) Applicant: GLASPRAY ENGINEERING & MANUFACTURING CO., LTD., Tainan (TW)

(72) Inventor: Sin-Hsiung Chen, Tainan (TW)

(73) Assignee: GLASPRAY ENGINEERING & MANUFACTURING CO., LTD., Tainan (TW)

( * ) Notice: Subject to any disclaimer, the term of this patent is extended or adjusted under 35 U.S.C. 154(b) by 82 days.

(21) Appl. No.: 17/739,490

(22) Filed: May 9, 2022

(65) Prior Publication Data

US 2023/0356890 A1 Nov. 9, 2023

(51) Int. Cl.

*A45D 40/22* (2006.01)
*A45D 40/06* (2006.01)
*B65D 85/72* (2006.01)
*B65D 43/16* (2006.01)

(Continued)

(52) U.S. Cl.

CPC ......... *B65D 43/164* (2013.01); *A45D 33/003* (2013.01); *A45D 40/22* (2013.01); *A61J 1/1412* (2013.01); *A45D 40/065* (2013.01); *A45D 2040/225* (2013.01)

(58) Field of Classification Search

CPC .... A45C 13/005; A45D 33/003; A45D 40/22; A45D 40/221; A45D 40/222; A45D 40/026; A45D 40/023; A45D 40/04; A45D 40/0068; A45D 40/065; A45D 2040/225; A61J 1/1412; B65D 43/164; B65D 43/26

USPC ........ 132/293, 318, 295; 206/581, 385, 250, 206/823; 220/263, 262, 23.87, 260, 581, 220/291; 401/78, 59, 98, 60, 77, 68

See application file for complete search history.

(56) References Cited

U.S. PATENT DOCUMENTS 1,824,029 A * 9/1931 Most .................... A45D 40/065 401/59
1,865,639 A * 7/1932 Most .................... A45D 40/065 401/59

(Continued)

FOREIGN PATENT DOCUMENTS

CN 1371642 A 10/2002
CN 104024120 A 9/2014

(Continued)

*Primary Examiner* — Gideon R Weinerth

(74) *Attorney, Agent, or Firm* — BACON&THOMAS,PLLC

(57) ABSTRACT

A container has a main body assembly, a top cover, and a top cover open-close operating unit. The main body assembly has a base and a sleeving cylinder. The sleeving cylinder rotatably sleeves the base and has an accommodating space with an opening upward and being capable of accommodating a content. The top cover is pivotally mounted on a top of the sleeving cylinder and is capable of opening and closing the opening of the accommodating space. The top cover open-close operating unit is moveably mounted in the main body assembly and is connected to the top cover. When the sleeving cylinder is rotated relative to the base, the sleeving cylinder drives the top cover to open or to close the opening of the accommodating space of the sleeving cylinder via the top cover open-close operating unit. The container facilitates ease in operation in opening and closing.

9 Claims, 11 Drawing Sheets

(51) Int. Cl.
*A45D 33/00* (2006.01)
*A61J 1/14* (2023.01)

(56) References Cited

U.S. PATENT DOCUMENTS

| | | | | | |
|---|---|---|---|---|---|
| 2,089,832 | A * | 8/1937 | Kasdan | A45D 40/065 401/71 |
| 2,121,383 | A * | 6/1938 | Conner | A45D 40/0068 220/23.2 |
| 2,513,830 | A * | 7/1950 | Voegeli | A45D 40/023 401/59 |
| 2,514,969 | A * | 7/1950 | Politzer | A45D 40/065 401/59 |
| 3,445,171 | A * | 5/1969 | Seidler | A45D 40/065 401/59 |
| 4,746,031 | A * | 5/1988 | Grandmottet | A45D 40/22 220/836 |
| 4,973,178 | A * | 11/1990 | Kakuta | A45D 40/065 401/59 |
| 5,356,025 | A | 10/1994 | Renault | |
| 5,423,622 | A * | 6/1995 | Perrotti | A45D 40/065 401/59 |
| 5,647,498 | A * | 7/1997 | Kaneko | B65D 47/088 220/832 |
| 5,833,962 | A * | 11/1998 | Chen | A45D 40/065 401/59 |
| 5,909,738 | A * | 6/1999 | Quennessen | A45C 13/008 132/294 |
| 5,975,093 | A * | 11/1999 | Joulia | A45D 40/22 220/291 |
| 5,979,468 | A * | 11/1999 | Blake, III | A45D 40/065 401/59 |
| 6,006,937 | A * | 12/1999 | Baravaglio | B65D 51/20 206/823 |
| 6,102,598 | A * | 8/2000 | Hsu | A45D 40/065 401/59 |
| 6,588,959 | B1 * | 7/2003 | Kuo | A45D 40/065 401/107 |
| 6,772,899 | B2 * | 8/2004 | Delmon | A45D 40/221 220/812 |
| 7,637,371 | B2 * | 12/2009 | Kang | A45D 40/065 401/59 |
| 8,152,398 | B2 * | 4/2012 | Kim | A45D 40/065 401/60 |
| 2003/0192892 | A1 * | 10/2003 | Fujita | B65D 50/061 220/291 |
| 2006/0285911 | A1 * | 12/2006 | Demellier | A45D 40/10 206/385 |
| 2011/0123249 | A1 * | 5/2011 | Delbove | A45D 40/023 401/59 |
| 2012/0099916 | A1 * | 4/2012 | Kim | A45D 40/065 206/385 |
| 2013/0058701 | A1 * | 3/2013 | Chan | A45D 40/22 401/59 |
| 2013/0105486 | A1 | 5/2013 | Mashburn et al. | |
| 2015/0291325 | A1 * | 10/2015 | Chou | B65D 43/26 220/23.91 |
| 2018/0360195 | A1 * | 12/2018 | Seguin | A45D 40/221 |
| 2019/0075908 | A1 | 3/2019 | Schlatter et al. | |
| 2023/0284766 | A1 * | 9/2023 | Kim | A45D 40/04 |
| 2023/0356890 | A1 * | 11/2023 | Chen | A45D 33/003 |

FOREIGN PATENT DOCUMENTS

| | | | |
|---|---|---|---|
| EP | 1295805 | A1 | 3/2003 |
| JP | 2007261671 | A | 10/2007 |
| TW | M307995 | U | 3/2007 |
| TW | M546728 | U | 8/2017 |
| TW | M627526 | U | 5/2022 |

* cited by examiner

CONTAINER

BACKGROUND OF THE INVENTION

1. Field of the Invention

The present invention relates to a container, especially to a container for cosmetics and medications and specialized in easy operation of opening.

2. Description of the Prior Arts

Cosmetics and medications in the form of paste or powder are packed in containers. As for cosmetics, a container is not only for accommodation, so how to facilitate the operation of opening and closing of cosmetic containers is one of the key projects to research and develop in the field of cosmetic containers. A conventional cosmetic container has a main body and a top cover. The main body forms an accommodating space inside with an opening upward to accommodate cosmetics. The top cover can be threaded with the main body to close the accommodating space, and be unthreaded to open the accommodating space.

However, the abovementioned conventional cosmetic container requires the user to rotate the top cover relative to the main body for multiple rounds to open or to close, which is inconvenient in operation to the user. Considering the ease of use, the conventional cosmetic container with a threaded cap needs to be improved.

To overcome the shortcomings, the present invention provides a container to mitigate or obviate the aforementioned problems.

SUMMARY OF THE INVENTION

The main objective of the present invention is to provide a container that facilitates ease in operation in opening and closing.

The container has a main body assembly, a top cover, and a top cover open-close operating unit. The main body assembly has a base and a sleeving cylinder. The sleeving cylinder rotatably sleeves the base and has an accommodating space with an opening upward and being capable of accommodating a content. The top cover is pivotally mounted on a top of the sleeving cylinder of the main body assembly and is capable of opening and closing the opening of the accommodating space. The top cover open-close operating unit is moveably mounted in the main body assembly and is connected to the top cover. When the sleeving cylinder is rotated relative to the base clockwise or counterclockwise, the sleeving cylinder drives the top cover to open or to close the opening of the accommodating space of the sleeving cylinder via the top cover open-close operating unit.

By the structure above, the container has the following advantages.

1. Ease in operation: The container can contain contents such as cosmetics or medications by the sleeving cylinder of the main body assembly. The sleeving cylinder can rotate relative to the base clockwise or counterclockwise in a pre-set angle range. When the sleeving cylinder is rotated relative to the base, the sleeving cylinder can move the top cover open-close operating unit to drive the top cover to open and or close the opening of the accommodating space on the top of the sleeving cylinder, which provides the user with an easy operation of opening or closing the top cover when storing or dispensing the content.

2. Ease in marking of recycling categories: The base and the sleeving cylinder of the main body assembly, the top cover, and the top cover open-close operating unit can all be made of plastic so that the container can be mass-produced by molding. Besides, since all those components can be made of plastic, marking the recycling category on each of those components is easy, which enables the container to be directly and simply classified during recycling, eliminates the need of classifying different materials, and therefore reduces time and cost of the recycling process.

Moreover, the sleeving cylinder of the main body assembly can also accommodate a content unit. The content unit has an accommodating case and a content such as cosmetics or medications installed in the accommodating case. The top of the accommodating case is sealed with a detachable sealing film, so that the content such as cosmetics or medications can be pre-sealed between the accommodating case and the sealing film, so as to avoid contamination of the content. On the other hand, by pre-loading the content such as cosmetics or medications into the content unit, the content can be easily loaded into the main body assembly. If the user intends to change the color or the type of the content, under the condition that the base, the sleeving cylinder, the top cover, and the top cover open-close operating unit can all be reused, the user can only replace the content unit with a new one that is loaded with a preferred content, thereby reducing waste of resources and lowering replacement costs.

Additionally, the annular wall of the base forms an up-and-down guiding groove. The top cover open-close operating unit is up-and-down moveably mounted in the sleeving cylinder and has a guiding segment mounted in the up-and-down guiding groove of the base. By the sleeving cylinder rotating relative to the base in a pre-set angle range, the guiding segment can be moved along the up-and-down guiding groove to switch height positions, so as to lift or to drop the top cover open-close operating unit in the sleeving cylinder and then easily and smoothly drive the top cover to open or to close.

Last but not the least, the bottom surface of the base forms a connecting recess. By the connecting recess, the container can be mounted on a connecting unit of a fixed object that is fixed on a dressing table or any table surface, so that the container can be positioned on the fixed object, which allows the user to rotate the sleeving cylinder of the main body assembly to easily open or close the top cover with one hand.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
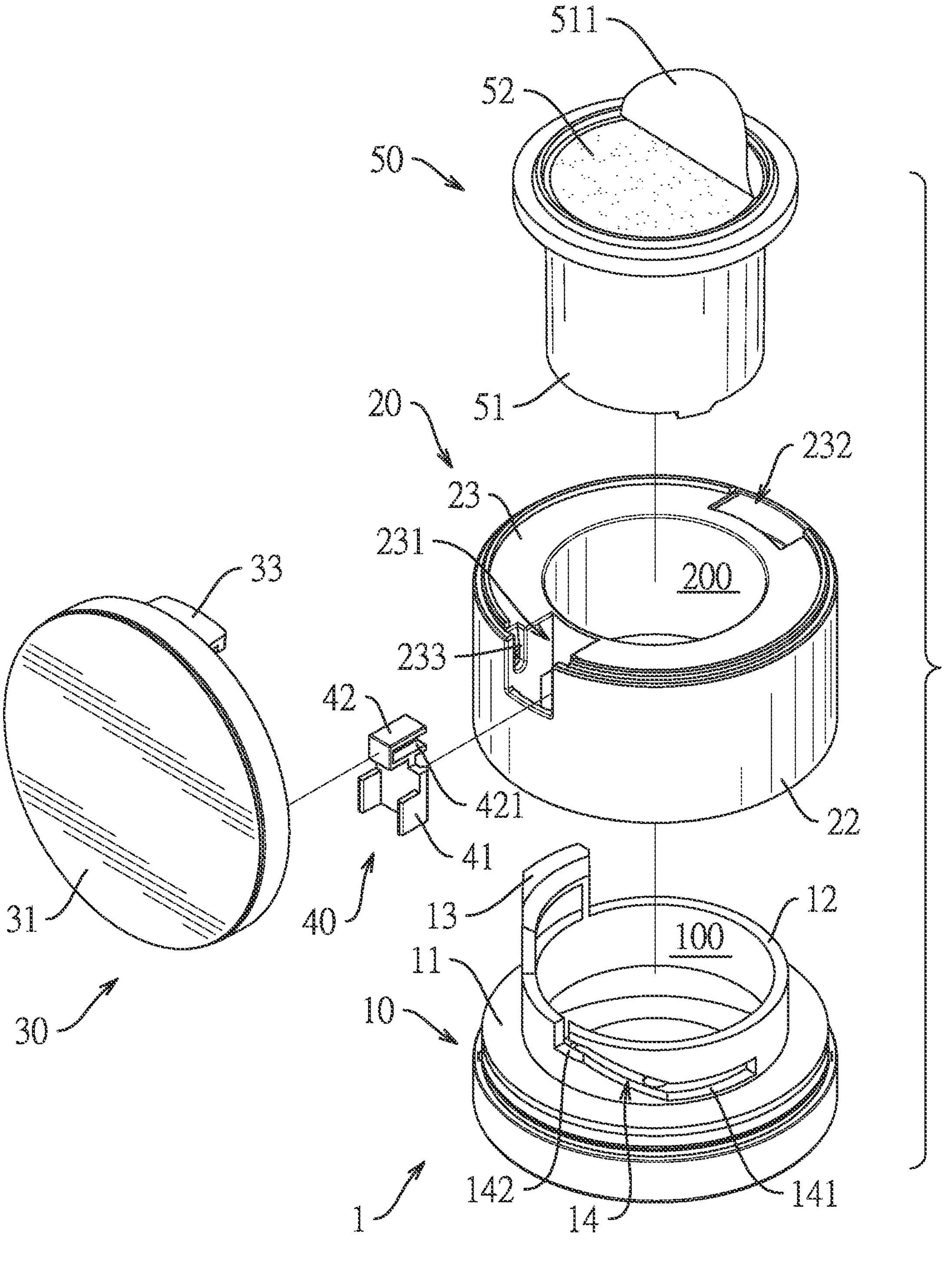
FIG. 1 is an exploded view of a preferred embodiment of a container in accordance with the present invention.
Figure 2:
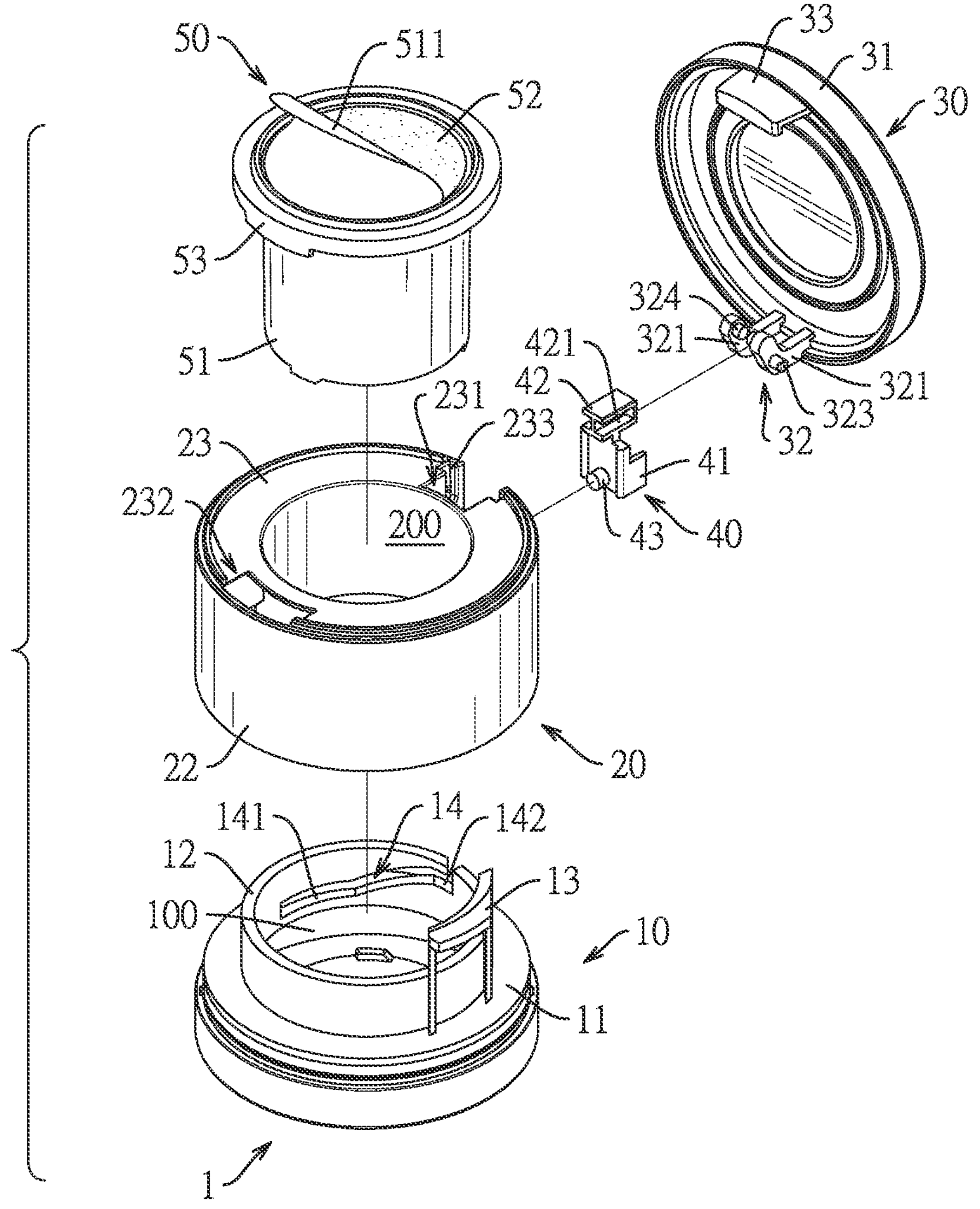
FIG. 2 is another exploded view of the preferred embodiment of the container in FIG. 1.
Figure 3:
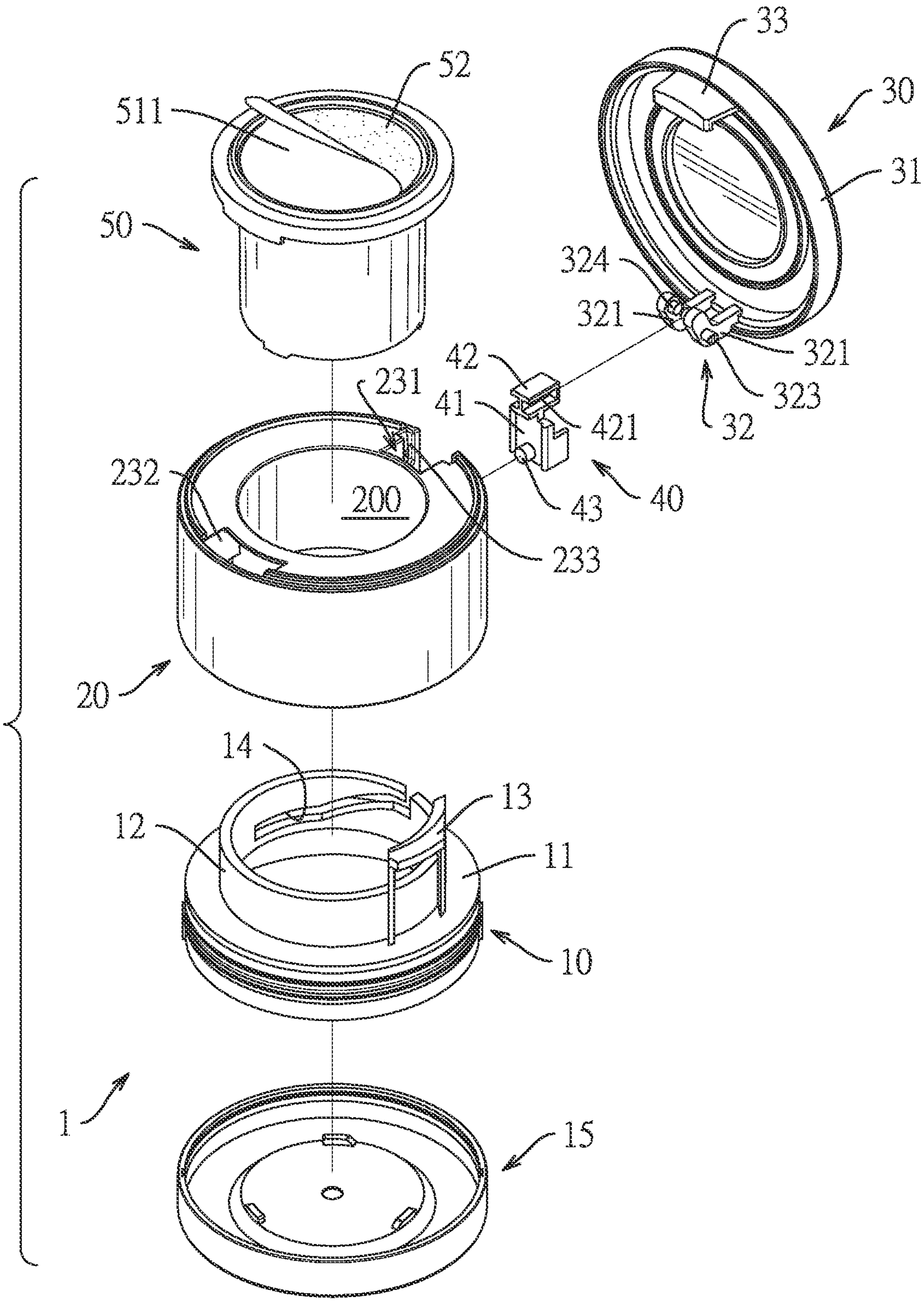
FIG. 3 is still another exploded view of the preferred embodiment of the container in FIG. 1, showing the main body assembly having a detachable sleeving case.
Figure 4:
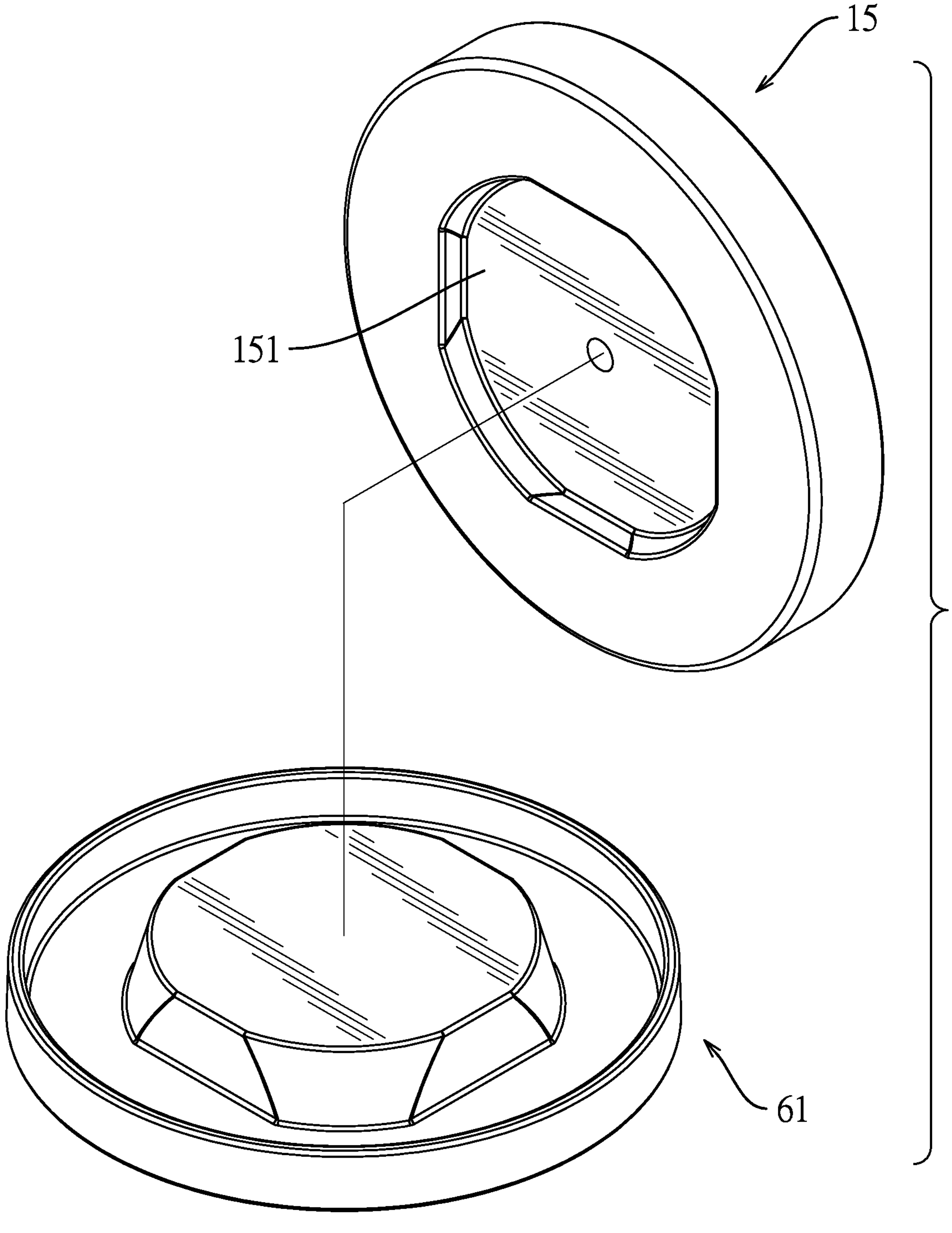
FIG. 4 is still another exploded view of the preferred embodiment of the container in FIG. 1, showing the sleeving case and a connecting unit.

With reference to FIGS. 1 to 3, a preferred embodiment of a container in accordance with the present invention is adapted to accommodate contents such as cosmetics and medications. The container comprises a main body assembly 1, a top cover 30, and a top cover open-close operating unit 40.

With reference to FIGS. 1 to 3, 5, and 6, the main body assembly 1 has a base 10 and a sleeving cylinder 20. The sleeving cylinder 20 is moveably sleeved on the base 10, and is capable of rotating relative to the base 10. The sleeving cylinder 20 has an accommodating space 200 having an opening upward. The accommodating space 200 is adapted to directly accommodate a content 52 such as cosmetics and medications, or the accommodating space 200 can also be configured to accommodate a content unit 50 that is loaded with the content 52 such as cosmetics and medications.

With reference to FIGS. 1 to 3, 5, and 6, the content unit 50 has an accommodating case 51 and the content 52 contained in the accommodating case 51. A sealing film 511 removably seals a top of the accommodating case to seal the content 52 between the accommodating case 51 and the sealing film 511, so as to prevent the content 52 from being polluted. When in use, the sealing film 511 is first peeled off from the top of the accommodating case 51. By pre-loading the content 52 such as cosmetics or medications into the content unit 50, the content 52 can be easily loaded into the main body assembly 1. If the user intends to change the color or the type of the content 52, under the condition that the base 10, the sleeving cylinder 20, the top cover 30, and the top cover open-close operating unit 40 can all be reused, the user can only replace the content unit 50 with a new one that is loaded with a preferred content 52. Preferably, in the content unit 50 shown in FIGS. 1 to 3, 5, and 6, a positioning protrusion 53 is mounted on the top of the accommodating case 51 and is adapted to be mounted in the sleeving cylinder 20 to position the accommodating case 51.

With reference to FIGS. 1 to 3, 5, and 6, in this embodiment, the base 10 of the main body assembly 1 has a pedestal 11, a sleeve segment 12, and a top cover buckling segment 13. The sleeve segment 12 is mounted on the base 10. The sleeve segment 12 has an annular wall. The annular wall has an up-and-down guiding groove 14 extending in an arc shape and being inclined. The up-and-down guiding groove 14 has a lower position segment 141 and a higher position segment 142 located higher than the lower position segment 141. The top cover buckling segment 13 is mounted on an outer annular surface of the annular wall. In this preferred embodiment, the base 10 has a base space 100 formed inside. The base space 100 forms an inputting opening on the top. The base space 100 can be a recess formed on the top of the annular wall extending downward to the pedestal 11, or the base space 100 can also be a through hole formed on the top of the annular wall extending downward and formed through a bottom of the pedestal 11.

With reference to FIGS. 1 to 3, 5, and 6, in this embodiment, the sleeving cylinder 20 of the main body assembly 1 rotatably sleeves the base 10. The sleeving cylinder 20 has an inner cylinder wall 21, an outer cylinder wall 22, and a top annular board 23. The outer cylinder wall 22 is located outside the inner cylinder wall 21 and is spaced apart from the inner cylinder wall 21. The top annular board 23 is connected to a top of the inner cylinder wall 21 and a top of the outer cylinder wall 22. A movement space 201 is formed between the inner cylinder wall 21 and the outer cylinder wall 22 and has an opening downward. The accommodating space 200 of the sleeving cylinder 20 is formed at a center of the top annular board 23 and extends downward to a bottom of the inner cylinder wall 21. The sleeving cylinder 20 rotatably sleeves the base 10. The inner cylinder wall 21 is located in the base space 100 of the base 10. The sleeve segment 12 of the base 10 is located in the movement space 201 between the inner cylinder wall 21 and the outer cylinder wall 22. The pedestal 11 of the base 10 extends out of a bottom of the sleeving cylinder 20. In this preferred embodiment, an assembling opening 231 and an insertion opening 232 are respectively formed on two sides at a top of the sleeving cylinder 20. The assembling opening 231 and the insertion opening 232 both communicate with the movement space 201 of the sleeving cylinder 20, and are configured to install the top cover 30. The positioning protrusion 53 of the content unit 50 mounted on the accommodating case 51 can be mounted in the insertion opening 232 to position the accommodating case 51.

With reference to FIGS. 1 to 3, 4, and 6, in this embodiment, the base 10 has a connecting recess 151 directly formed on a bottom of the pedestal 11. Alternatively, the base 10 has a sleeving case 15 detachably covering the pedestal 11, and the connecting recess 151 is formed on a bottom surface of the sleeving case 15. The connecting recess 151 is a non-circular recess. The non-circular connecting recess 151 can be polygonal in an end view, or can be a recess composed of flat surfaces and curved surfaces. With reference to FIGS. and 11, the connecting recess 151 is configured to engage a connecting unit 61 of a fixed object 60. A top of the connecting unit 61 forms an engaging segment that matches the connecting recess in shape. By the engaging segment mounted in and engaging with the non-circular connecting recess 151, the base 10 can be positioned on the fixed object 60, and therefore the user can rotate the sleeving cylinder 20 of the main body assembly 1 relative to the base 10 with one hand.

With reference to FIGS. 1 to 3, 5, and 6, the top cover 30 is pivotally mounted on the top of the sleeving cylinder 20, and can be operated to open or to close the opening of the accommodating space 200. In this preferred embodiment, the top cover 30 has a cover body 31, a pivotally connecting segment 32, and a buckle 33. The pivotally connecting segment 32 and the buckle 33 are respectively mounted on two opposite sides of the cover body 31. The pivotally connecting segment 32 is pivotally mounted in the assembling opening 231 on the top of the sleeving cylinder 20. The buckle 33 is capable of passing through the insertion opening 232.

With reference to FIGS. 1 to 3, 5, and 6, two pivotally connecting recesses 233 are respectively formed on two opposite side surfaces of the assembling opening 231 of the sleeving cylinder 20. The pivotally connecting segment 32 of the top cover 30 has two curved arms 321 spaced apart and parallel to each other. Two pivots 323 are respectively mounted on two middle sections of the two curved arms 321, are located in an outer side of the two curved arms 321, and are respectively pivotally mounted in the two pivotally connecting recesses 233. The cover body 31 of the top cover 30 is located outside the sleeving cylinder 20. Two end sections of the two curved arms 321 extend into the movement space 201 of the sleeving cylinder 20 to pivotally mount the top cover 30 on the top of the sleeving cylinder 20, and to connect the two curved arms 321 of the pivotally connecting segment 32 to the top cover open-close operating unit 40, so that the top cover 30 can be driven to rotate. Preferably, the two pivotally connecting recesses 233 are formed on the top of the side walls of the assembling opening 231 and extend downward, so the two pivots 323 of the top cover 30 mounted on the two curved arms 321 can be moved into the two pivotally connecting recesses 233 from the top downward. In this preferred embodiment, two sliding segments 324 are respectively formed on the two end sections of the two curved arms 321.

With reference to FIGS. 1 to 3, 5, and 6, the top cover open-close operating unit 40 is moveably mounted in the main body assembly 1, is connected to the pivotally connecting segment 32 of the top cover 30, and is capable of driving the top cover 30 to open or to close the opening of the accommodating space 200 of the sleeving cylinder 20 by the sleeving cylinder 20 and the base 10 of the main body assembly 1 rotating relative to each other. In this preferred embodiment, the top cover open-close operating unit 40 is up-and-down moveably mounted in the movement space 201 of the sleeving cylinder 20 of the main body assembly 1, and the top cover open-close operating unit 40 has an operating unit main body 41, a driving segment 42, and a guiding segment 43. The guiding segment 43 is mounted on a side surface of the operating unit main body 41. The guiding segment 43 extends into the up-and-down guiding groove 14 of the base 10 of the main body assembly 1. The driving segment 42 is mounted on a top of the operating unit main body 41 and is moveably connected to the two end sections of the two curved arms 321 of the pivotally connecting segment 32. In this preferred embodiment, two horizontal sliding grooves 421 are respectively formed on two sides of the driving segment 42, and the two sliding segments 324 on the two end sections of the two curved arms 321 are respectively mounted into the two sliding segments 324.

The base 10 and the sleeving cylinder 20 of the main body assembly 1, the top cover 30, and the top cover open-close operating unit 40 can be made of plastic materials such as Polyethylene terephthalate (PET), Polypropylene (PP), or Acrylonitrile Butadiene Styrene (ABS), so that the container of the present invention can be mass-produced by molding. Besides, the base 10 and the sleeving cylinder 20 of the main body assembly 1, the top cover 30, and the top cover open-close operating unit 40 can all be made of the same plastic material.

Figure 5:
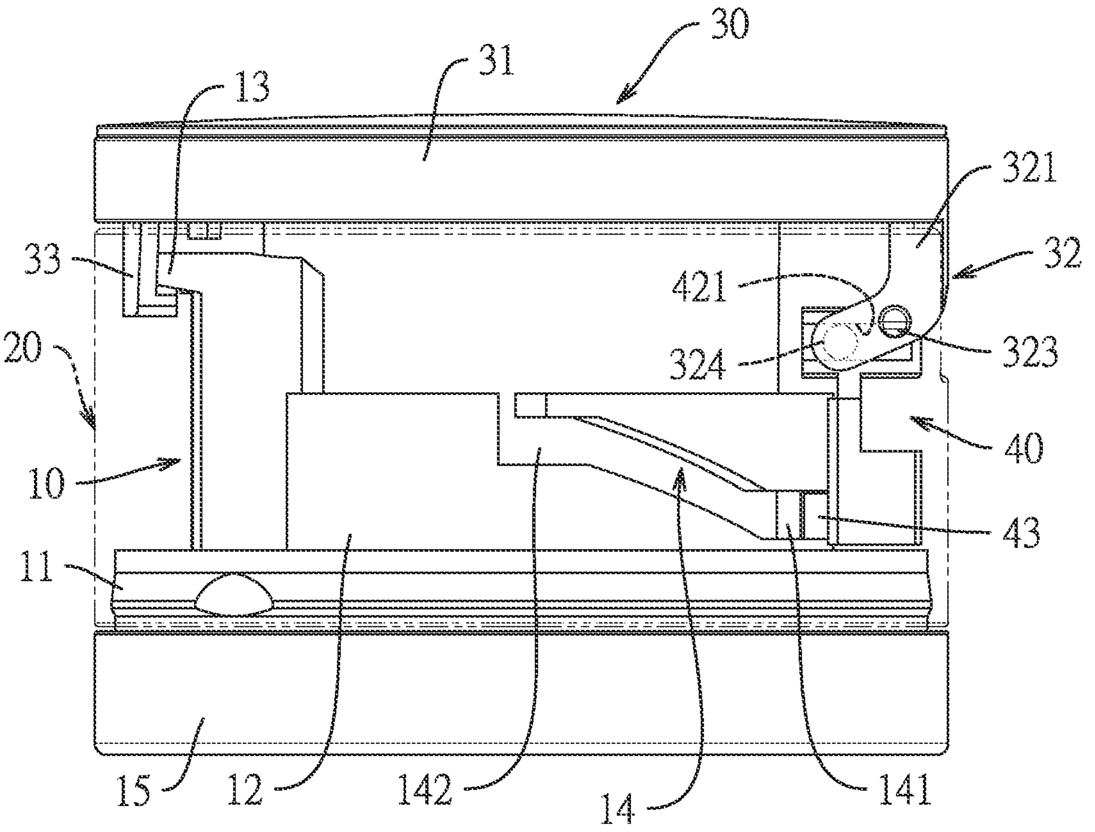
FIG. 5 is a side view of the preferred embodiment of the container in FIG. 1, showing the top cover closed.
Figure 6:
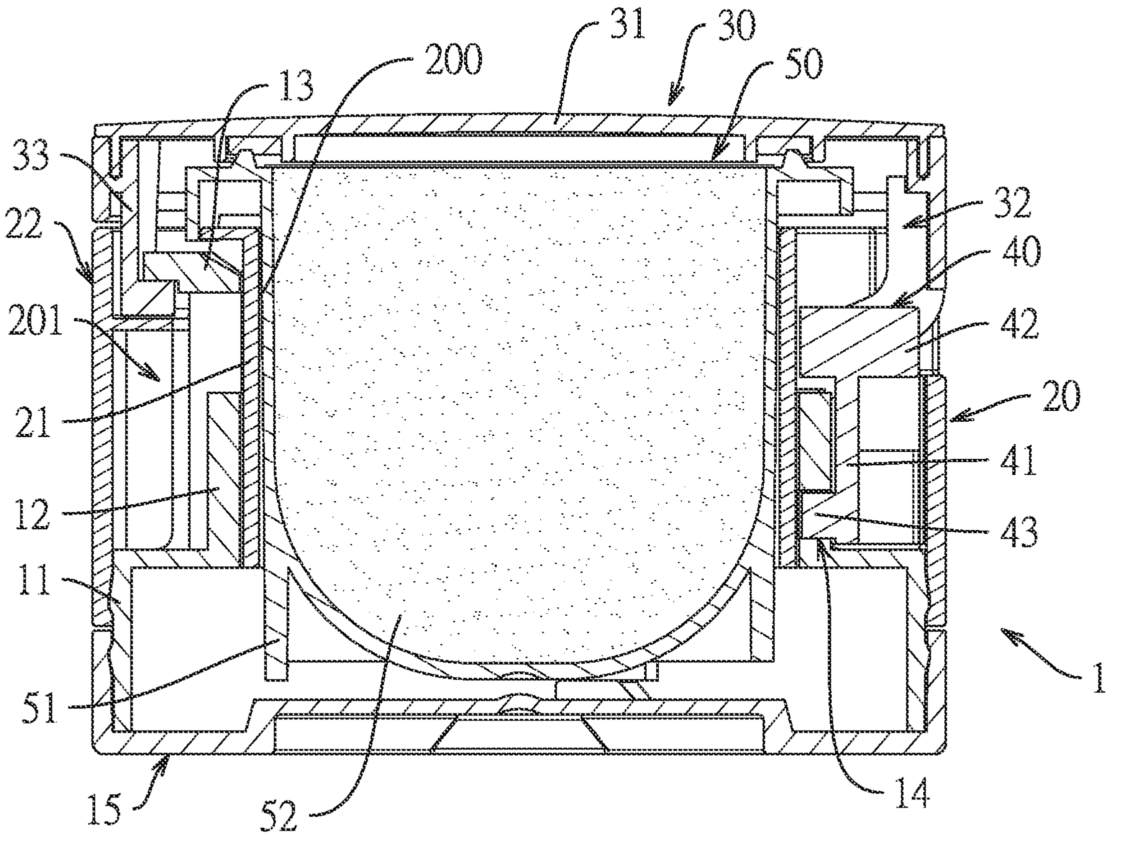
FIG. 6 is a side view in cross-section of the preferred embodiment of the container in FIG. 1, showing the top cover closed.

With reference to FIGS. 5 and 6, regarding the use of the container of the present invention, when the container contains the content unit 50 and the top cover 30 is closed, the guiding segment 43 of the top cover open-close operating unit 40 connecting the top cover 30 is located in the lower position segment 141 of the main body assembly 1. In other words, the top cover open-close operating unit 40 is located at a position that is low in height, so the top cover open-close operating unit 40 pulls the end section of the pivotally connecting segment 32 of the top cover 30 to rotate downward, and the cover body 31 of the top cover 30 covers the top of the sleeving cylinder 20 of the main body assembly 1.

Figure 7:
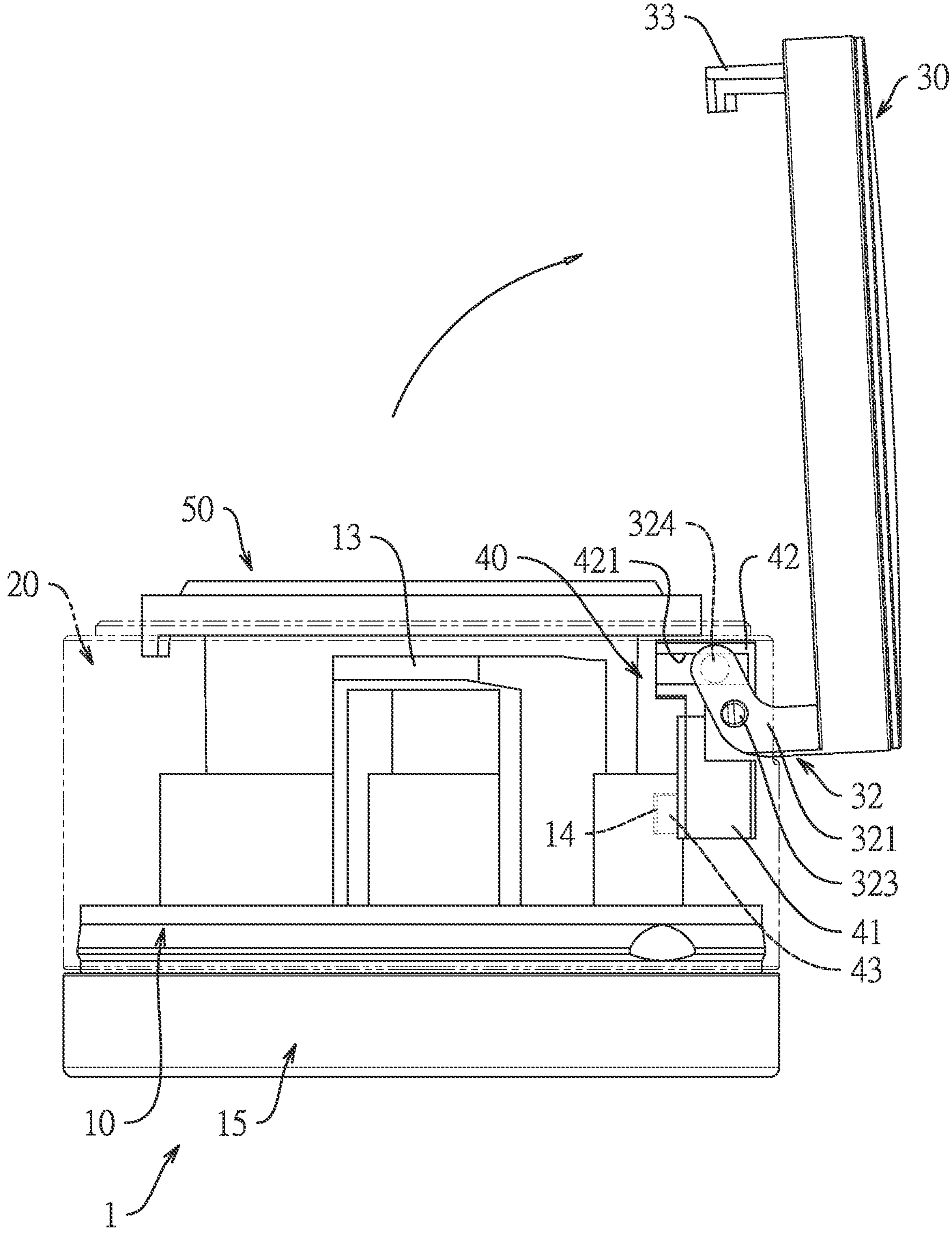
FIG. 7 is another side view of the preferred embodiment of the container in FIG. 1, showing the top cover opened.
Figure 8:
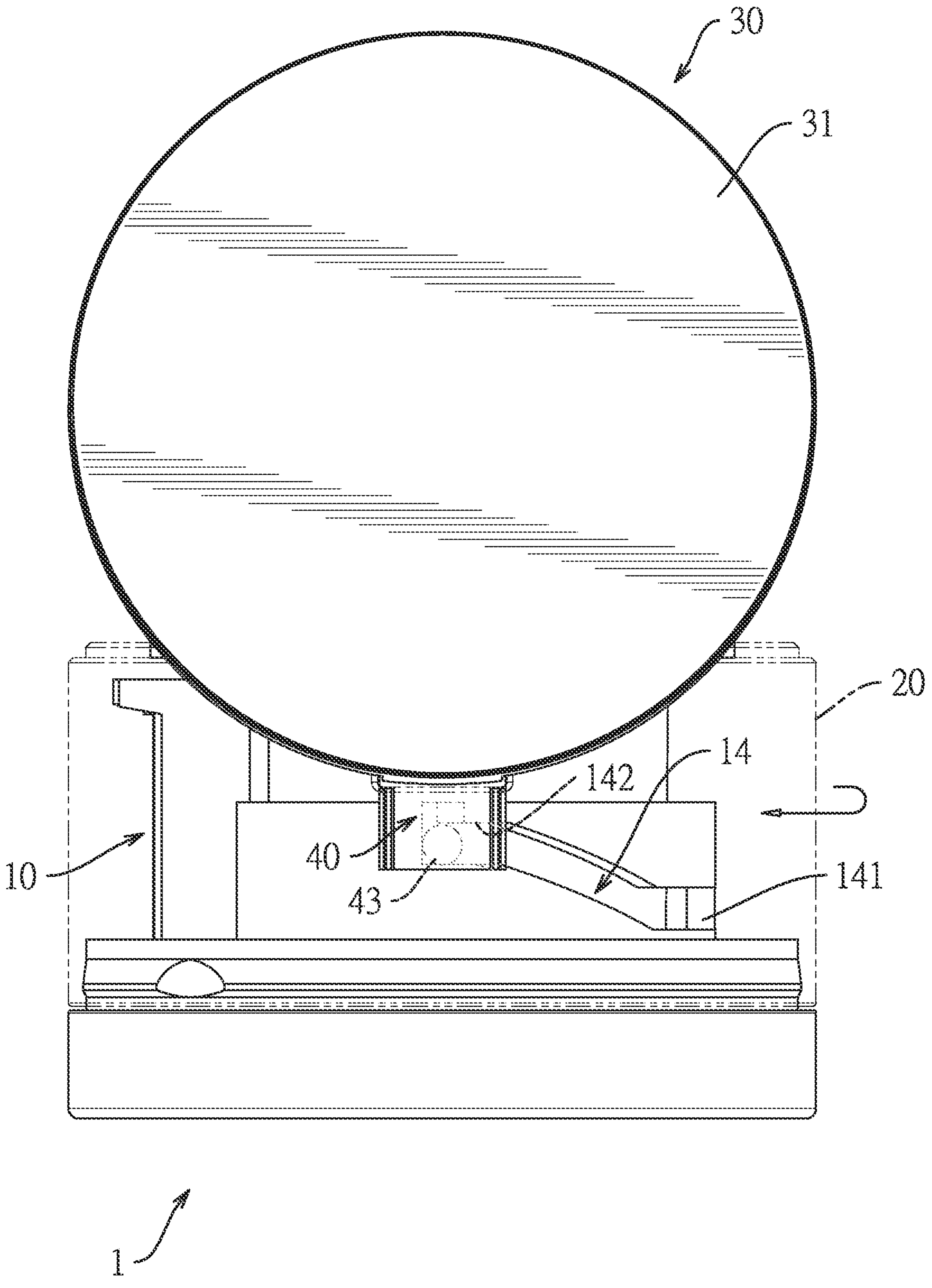
FIG. 8 is still another side view of the preferred embodiment of the container in FIG. 1, showing the top cover opened from another perspective.
Figure 9:
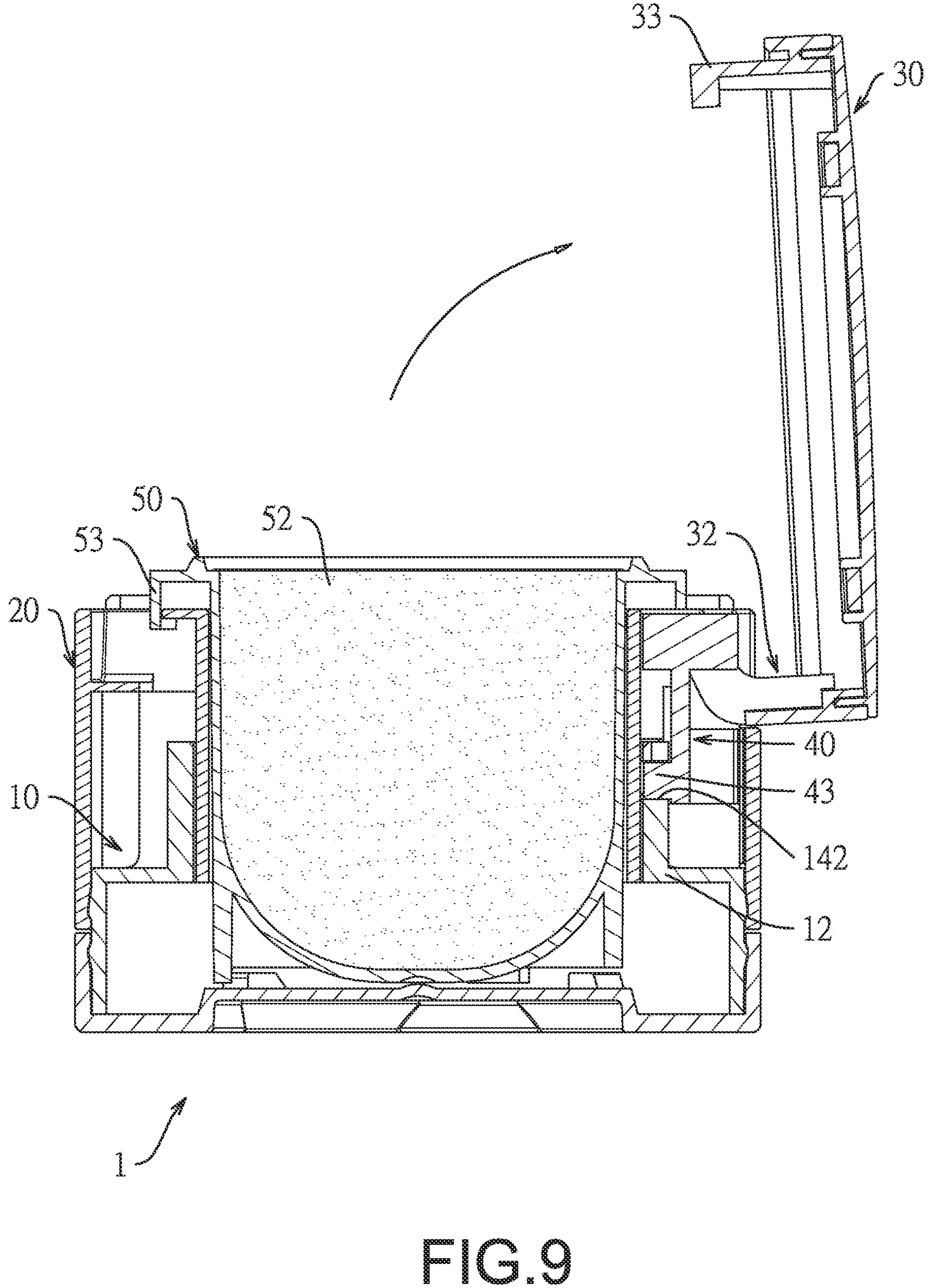
FIG. 9 is another side view in cross-section of the preferred embodiment of the container in FIG. 1, showing the top cover opened.

With reference to FIGS. 7 to 9, when the user intends to open the top cover 30, the user only needs to rotate the sleeving cylinder 20 relative to the base 10, and during rotating the top cover open-close operating unit 40 will be moved upward and synchronously drive the top cover 30 to open the opening on the top of the sleeving cylinder 20. Herein, by the annular wall of the base 10 forming the up-and-down guiding groove 14 in an arc-shape and being inclined, and the top cover open-close operating unit 40 moveably mounted in the sleeving cylinder 20 and having the guiding segment 43 mounted in the up-and-down guiding groove 14, during the rotation of the sleeving cylinder 20 relative to the base 10, the guiding segment 43 moves along the up-and-down guiding groove 14 from the lower position segment 141 to the higher position segment 142, so the top cover open-close operating unit 40 will be moved upward to drive the top cover 30 to open. On the contrary, when the user intends to close the top cover 30, the user reversely rotates the sleeving cylinder 20, and the abovementioned mechanism works reversely to drive the top cover 30 to close. To sum up, the relative rotation of the sleeving cylinder 20 and the base 10 drives the top cover 30 to open and to close, thereby simplifying the operation and facilitating improved user experience.

Figure 10:
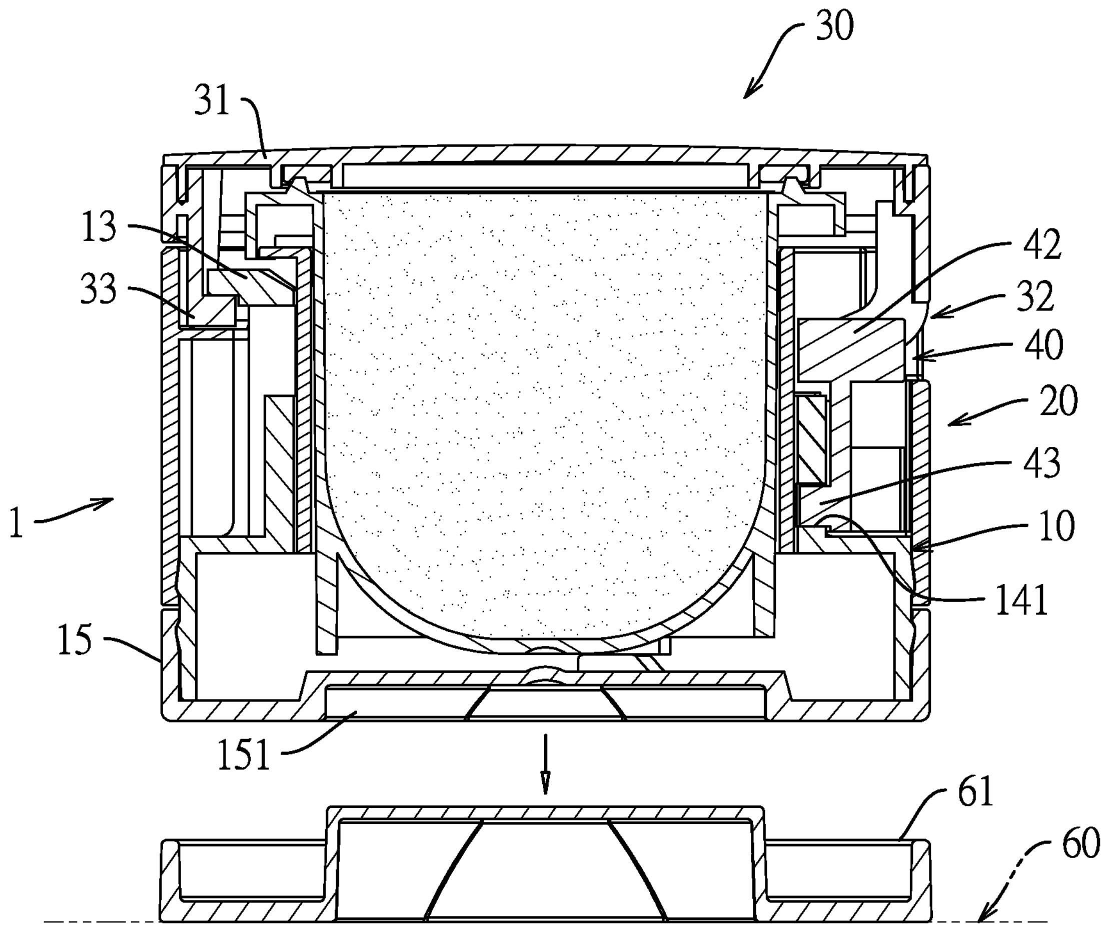
FIG. 10 is an operational view of the preferred embodiment of the container in FIG. 1, showing the container and a fixed object.
Figure 11:
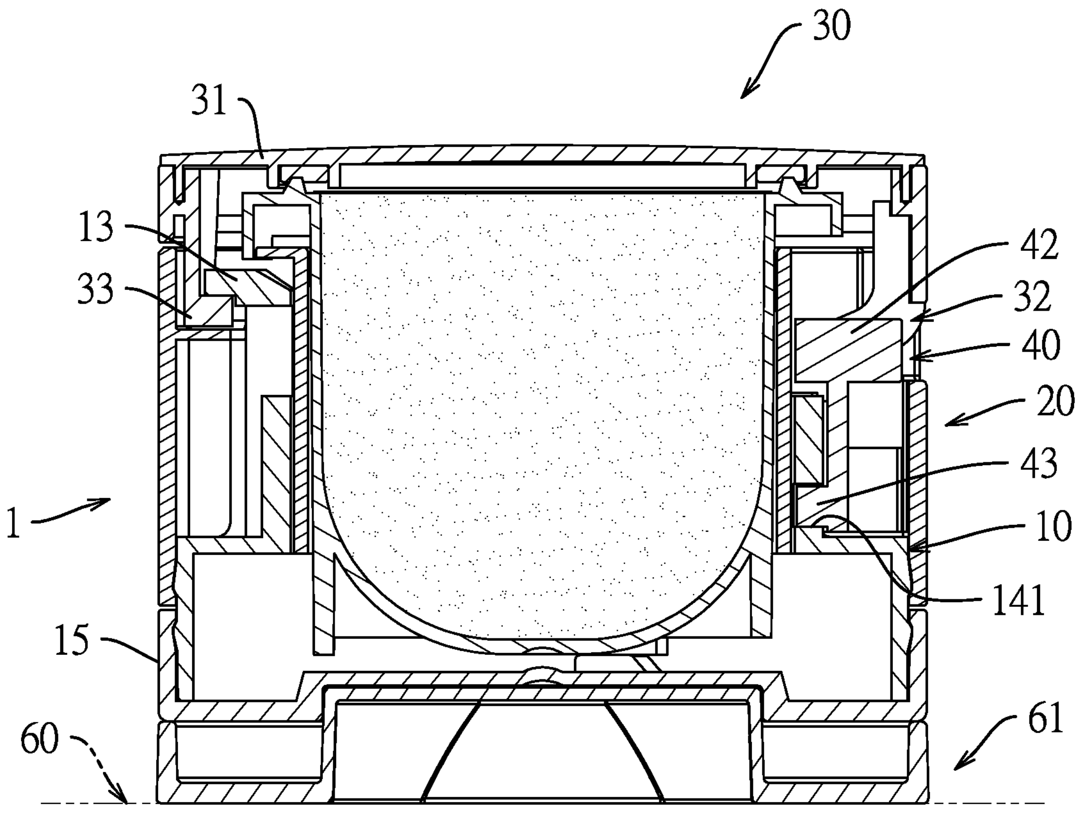
FIG. 11 is another operational view of the preferred embodiment of the container in FIG. 1, showing the container mounted on the fixed object.

Moreover, with reference to FIGS. 10 and 11, by the bottom surface of the base 10 forming the connecting recess 151, the container can engage with the connecting unit 61 of the fixed object 60 such as a dressing table to position the base 10 on the fixed object 60, so that the user can rotate the sleeving cylinder 20 easily with one hand.

Additionally, the container uses the content unit 50 to pre-load the content 52 such as cosmetics or medications to prevent the content 52 from being polluted. The sealing film 511 of the content unit 50 is detached until use. By preloading the content 52 such as cosmetics or medications into the content unit 50, the content 52 can be easily loaded into the main body assembly 1. If the user intends to change the color or the type of the content 52, under the condition that the base 10, the sleeving cylinder 20, the top cover 30, and the top cover open-close operating unit 40 can all be reused, the user can only replace the content unit 50 with a new one that is loaded with a preferred content 52.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A container comprising:
- a main body assembly having
  - a base;
  - a sleeving cylinder rotatably sleeving the base and having
    - an accommodating space with an opening upward and being capable of accommodating a content;
- a top cover pivotally mounted on a top of the sleeving cylinder of the main body assembly and being capable of opening and closing the opening of the accommodating space; and a top cover open-close operating unit moveably mounted in the main body assembly and connected to the top cover; wherein when the sleeving cylinder is rotated relative to the base clockwise or counterclockwise, the sleeving cylinder drives the top cover to open or to close the opening of the accommodating space of the sleeving cylinder via the top cover open-close operating unit;

wherein, the base has a pedestal;

a sleeve segment mounted on the pedestal and having an annular wall forming an up-and-down guiding groove extending in an arc-shape, being inclined, and having a lower position segment; and a higher position segment located higher than the lower position segment; and a top cover buckling segment mounted on an outer annular surface of the annular wall;

the sleeving cylinder has an inner cylinder wall located in a base space of the base;

an outer cylinder wall located outside the inner cylinder wall and spaced apart from the inner cylinder wall;

a top annular board connected to a top of the inner cylinder wall and a top of the outer cylinder wall; the accommodating space formed at a center of the top annular board and extending downward to a bottom of the inner cylinder wall;

a movement space formed between the inner cylinder wall and the outer cylinder wall and having an opening downward; the annular wall of the base located in the movement space; the pedestal of the base extending out of a bottom of the sleeving cylinder;

an assembling opening formed on the top of the sleeving cylinder and communicating with the movement space; and an insertion opening formed on the top of the sleeving cylinder, being opposite to the assembling opening, and communicating with the movement space;

the top cover has a cover body;

a pivotally connecting segment mounted on the cover body and pivotally mounted in the assembling opening on the top of the sleeving cylinder; and a buckle mounted on the cover body, located opposite to the pivotally connecting segment, being capable of passing the insertion opening of the sleeving cylinder, and adapted to be buckled by the top cover buckling segment; and the top cover open-close operating unit is movably mounted in the assembling opening of the main body assembly, is connected to the pivotally connecting segment of the top cover, and has a guiding segment mounted in the up-and-down guiding groove of the base;

the top cover open-close operating unit is moved up and down by the sleeving cylinder rotating relative to the base to move the guiding segment along the up-and-down guiding groove.

2. The container as claimed in claim 1, wherein two pivotally connecting recesses are respectively formed on two opposite side walls of the assembling opening of the sleeving cylinder;

the pivotally connecting segment of the top cover has two curved arms spaced apart and being parallel to each other;

two pivots respectively mounted on two middle sections of the two curved arms, located in an outer side of the two curved arms, and respectively pivotally mounted in the two pivotally connecting recesses;

two sliding segments respectively mounted on two end sections of the two curved arms; the cover body of the top cover located outside the sleeving cylinder; the two end sections of the two curved arms extending into the movement space of the sleeving cylinder;

the top cover open-close operating unit is mounted in the movement space of the sleeving cylinder, is capable of moving up and down, and has an operating unit main body; the guiding segment mounted on a side surface of the operating unit main body;

a driving segment mounted on a top of the operating unit main body;

two sliding grooves respectively formed on two sides of the driving segment;

the two sliding segments of the top cover respectively mounted in the sliding grooves.

3. The container as claimed in claim 2, wherein a content unit is mounted in the accommodating space of the sleeving cylinder and has an accommodating case;

a sealing film removably sealing a top of the accommodating case; and a positioning protrusion mounted on the top of the accommodating case and adapted to be mounted in the insertion opening of the sleeving cylinder to position the accommodating case.

4. The container as claimed in claim 2, wherein a connecting recess is formed on a bottom surface of the base and is adapted to engage with an engaging segment of a connecting unit mounted on a fixed object to position the base on the fixed object.

5. The container as claimed in claim 4, wherein the base has a sleeving case detachably covering the pedestal;

the connecting recess is formed on a bottom surface of the sleeving case.

6. The container as claimed in claim 1, wherein a content unit is mounted in the accommodating space of the sleeving cylinder and has an accommodating case; and a sealing film removably sealing a top of the accommodating case.

7. The container as claimed in claim 1, wherein a content unit is mounted in the accommodating space of the sleeving cylinder and has an accommodating case;

a sealing film removably sealing a top of the accommodating case; and a positioning protrusion mounted on the top of the accommodating case and adapted to be mounted in the insertion opening of the sleeving cylinder to position the accommodating case.

8. The container as claimed in claim 1, wherein a connecting recess is formed on a bottom surface of the base and is adapted to engage with an engaging segment of a connecting unit mounted on a fixed object to position the base on the fixed object.

9. The container as claimed in claim 8, wherein the base has a sleeving case detachably covering the pedestal;
the connecting recess is formed on a bottom surface of the sleeving case.

* * * * *